(12) United States Patent
Hatakoshi

(10) Patent No.: US 6,885,808 B2
(45) Date of Patent: Apr. 26, 2005

(54) OPTICAL PROBE AND OPTICAL PICK-UP APPARATUS

(75) Inventor: Genichi Hatakoshi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 325 days.

(21) Appl. No.: 09/949,648

(22) Filed: Sep. 12, 2001

(65) Prior Publication Data

US 2002/0031299 A1 Mar. 14, 2002

(30) Foreign Application Priority Data

Sep. 12, 2000 (JP) .......................................... 2000-277109

(51) Int. Cl.[7] ................................................ G02B 6/10
(52) U.S. Cl. ........................................ 385/146; 385/123
(58) Field of Search .............................. 385/123, 146, 385/12, 15, 31–43, 127, 128

(56) References Cited

U.S. PATENT DOCUMENTS

| | | | |
|---|---|---|---|
| 5,288,999 A | * | 2/1994 | Betzig et al. .......... 250/227.26 |
| 5,841,129 A | * | 11/1998 | Bacsa ...................... 250/216 |
| 5,978,139 A | | 11/1999 | Hatakoshi et al. |

FOREIGN PATENT DOCUMENTS

| | | | |
|---|---|---|---|
| JP | 11-265520 | 9/1999 | |
| JP | 2002279671 A | * 9/2002 | ............ G11B/7/12 |

OTHER PUBLICATIONS

Shuji Mononobe, et al. "Reproducible Fabrication of a Fiber Probe with a Nanometric Protrusion for Near–Field Optics" Applied Optics, vol. 36, No. 7. Mar. 1, 1997. pp. 1496–1500.

Young–Joo Kim, et al. "Fabrication of Micro–Pyramidal Probe Array with Aperture for Near–Field Optical Memory Applications" Japanese Journal of Applied Physics, vol. 39, Part I, No. 3B, Mar., 2000, pp. 1538–1541.

* cited by examiner

*Primary Examiner*—Khiem Nguyen
(74) *Attorney, Agent, or Firm*—Oblon, Spivak, McClelland, Maier & Neustadt, P.C.

(57) ABSTRACT

Disclosed is an optical probe for obtaining a micro spot light, comprising a rod-like glass body having a rectangular cross section as a core for propagating a light wave. The distal end portion of the glass body is gradually diminished toward the distal end so as to form a micro distal end face having a small diameter. The side surface of the distal end portion of the glass body in a direction perpendicular to the polarized direction of the light wave is coated with a light absorber formed of a metal film.

14 Claims, 5 Drawing Sheets

OPTICAL PROBE AND OPTICAL PICK-UP APPARATUS

CROSS-REFERENCE TO RELATED APPLICATIONS

This application is based upon and claims the benefit of priority from the prior Japanese Patent Application No. 2000-277109, filed Sep. 12, 2000, the entire contents of which are incorporated herein by reference.

BACKGROUND OF THE INVENTION

1. Field of the Invention

The present invention relates to an optical probe for obtaining a micro light spot and an optical pick-up apparatus using said optical probe.

2. Description of the Related Art

In recent years, an optical probe utilizing an optical near field is used for recording information in an optical disk with a resolution not higher than the diffraction-limited of light or for observing the surface of an object to be measured, as disclosed in, for example, publication 1 (S. Mononobe et al.: "Reproducible fabrication of a fiber probe with a nanometric protrusion for near-field optics", Appl. Opt., Vol. 36, No. 8 (11997) pp. 1496–1500) and publication 2 (Y. Kim et al.; "Fabrication of micro-pyramidal probe array with aperture for near-field optical memory applications", Jpn. J. Appl. Phys., Vol. 39, No. 3B (2000) pp. 1538–1541). In this optical probe, the distal end side of an optical fiber is sharpened and the side surface the distal end portion is coated with a metal so as to confine the light wave in a micro region so as to obtain a micro spot.

However, the optical probe of this kind gives rise to the problem that, because of the absorption by the metal coated on the side surface, the light throughput efficiency is very low. It is certainly possible to avoid the absorption loss, if the metal coating is not applied to the side surface. In this case, however, the oozing of the light wave from the sharpened distal end portion of the optical fiber is increased, resulting in failure to obtain a micro spot.

As described above, the conventional optical probe having a metal coating applied to the side surface of the sharpened distal end portion of an optical fiber gives rise to the problems that the throughput efficiency of the light passing through the probe is very low and that it is impossible to obtain a desired micro spot unless the metal coating is not applied to the side surface.

BRIEF SUMMARY OF THE INVENTION

An object of the present invention is to provide an optical probe capable of confining the light wave to a core portion so as to make the spot diameter very small and capable of sufficiently increasing the throughput efficiency of the light wave passing through the core portion.

Another object of the present invention is to provide an optical pick-up apparatus for performing the recording in an optical disk and for observing the surface of a target to be observed by using the optical probe referred to above.

According to a first aspect of the present invention, there is provided an optical probe for guiding an light wave in a predetermined propagating direction and outputting a predetermined component of the light wave, the optical prove being located in the atmosphere, comprising:

a core configured to transmit the light wave, having a first refractive index, comprising a base portion, and a end portion having a end face and first and second side surfaces, the end portion being gradually diminished from the base portion to the end face, the first side surface being inclined to a first direction perpendicular to the predetermined propagating direction and the second side surface being inclined to a second direction perpendicular to the first direction and the predetermined propagating direction; and a light absorbing layer formed on the first side surface of the core, the second side surface being exposed to the atmosphere, the light wave being confined in the end portion, a part of the light wave being absorbed in the light absorbing layer, and the predetermined component penetrating the end face.

According to a second aspect of the present invention, there is provided an optical probe for guiding an light wave in a predetermined propagating direction and outputting a predetermined component of the light wave, the optical prove being located in the atmosphere, comprising:

a core configured to transmit the light wave, having a first refractive index, comprising a base portion, and a end portion having a end face and first and second pairs of opposing side surfaces, the end portion being gradually diminished from the base portion to the end face, the opposing side surface of the first pair being inclined to each other and spaced apart in a first direction perpendicular to the predetermined propagating direction, and the opposing side surface of the second pair being inclined to each other and spaced apart in a second direction perpendicular to the first direction and the predetermined propagating direction;

a light absorbing layer formed on the opposing side surface of the first pair, the opposing side surface of the second pair being exposed to the atmosphere, the light wave being confined in the end portion, a part of the light wave being absorbed in the light absorbing layer, and the predetermined component penetrating the end face.

According to a third aspect of the present invention, there is provided an optical probe for guiding an light wave in a predetermined propagating direction and outputting a predetermined component of the light wave, comprising:

a core configured to transmit the light wave, having a first refractive index, comprising a base portion, and a end portion having a end face and first and second side surfaces, the end portion being gradually diminished from the base portion to the end face, the first side surface being inclined to a first direction perpendicular to the predetermined direction and the second side surface being inclined to a second direction perpendicular to the first direction and the predetermined propagating direction;

a light absorbing layer formed on the first side surface of the core; and a transparent cladding layer having a second refractive index lower than the first refractive index of the core, and formed on the second side surface of the core, the light wave being confined in the end portion, a part of the light wave being absorbed in the light absorbing layer, and the predetermined component penetrating the end face.

According to a fourth aspect of the present invention, there is provided an optical probe for guiding an light wave in a predetermined propagating direction and outputting a predetermined component of the light wave, comprising:

a core configured to transmit the light wave, having a first refractive index, comprising a base portion, and a end portion having a end face and first and second pairs of opposing side surfaces, the end portion being gradually diminished from the base portion to the end face, the opposing side surface of the first pair being inclined to each other and spaced apart in a first direction perpendicular to the predetermined direction, and the opposing side surface of the second pair being inclined to each other and spaced apart in a second direction perpendicular to the first direction and the predetermined propagating direction;

a light absorbing layer formed on the opposing side surface of the first pair; and a transparent cladding layer having a second refractive index lower than the first refractive index of the core, and formed on the opposing side surface of the second pair, the light wave being confined in the end portion, a part of the light wave being absorbed in the light absorbing layer, and the predetermined component penetrating the end face.

In an embodiment of the present invention, it is desirable for the optical probe to be constructed as follows:

(1) The light absorber should be formed of a metal film.
(2) The core should be formed of a dielectric material.
(3) The core should be formed of a semiconductor material.
(4) The core should be prepared by processing the distal end portion of a rod-like optical guide such that the cross section of the distal end portion is gradually diminished toward the distal end from a base portion of the optical guide to form a pyramidal configuration, and the inclined side surface of the pyramidal distal end portion is coated with the light absorber.
(5) The end face of the distal end portion of the core should be shaped rectangular. The end face have first and second pairs of opposing sides, wherein the opposing sides being of the first pair are substantially parallel in the polarized direction of the light wave, the opposing sides of the second pair are substantially perpendicular to the polarized direction of the light wave, and a first width of the first side is shorter than a second width of the second side.

According to a fifth aspect of the present invention, there is provided an optical pick-up apparatus for searching a target with a predetermined optical component, comprising:

a light source configured to generate an light wave having the predetermined optical component;

an optical probe configured to guide an light wave in a predetermined propagating direction and outputting the predetermined component of the light wave to the target, the optical prove being located in the atmosphere, including:

a core configured to transmit the light wave, having a first refractive index, comprising a base portion, and a end portion having a end face and first and second pairs of opposing side surfaces, the end portion being gradually diminished from the base portion to the end face, the opposing side surface of the first pair being inclined to each other and spaced apart in a first direction perpendicular to the predetermined propagating direction, and the opposing side surface of the second pair being inclined to each other and spaced apart in a second direction perpendicular to the first direction and the predetermined propagating direction;

a light absorbing layer formed on the opposing side surface of the first pair, the opposing side surface of the second pair being exposed to the atmosphere, the light wave being confined in the end portion, a part of the light wave being absorbed in the light absorbing layer, and the predetermined component penetrating the end face to the target, and the predetermined component being reflected from the target and guided into the optical probe through the end face of the core; and a sensing section configured to sense the predetermined component emerged from the probe.

According to a sixth aspect of the present invention, there is provided an optical pick-up apparatus for searching a target with a predetermined optical component, comprising:

a light source configured to generate an light wave having the predetermined optical component;

an optical probe configured to guide an light wave in a predetermined propagating direction and outputting the predetermined component of the light wave to the target, including:

a core configured to transmit the light wave, having a first refractive index, comprising a base portion and a end portion having a end face and first and second pairs of opposing side surfaces, the end portion being gradually diminished from the base portion to the end face, the opposing side surface of the first pair being inclined to each other and spaced apart in a first direction perpendicular to the predetermined direction, and the opposing side surface of the second pair being inclined to each other and spaced apart in a second direction perpendicular to the first direction and the predetermined propagating direction;

a light absorbing layer formed on the opposing side surface of the first pair; and a transparent cladding layer having a second refractive index lower than the first refractive index of the core, and formed on the opposing side surface of the second pair, the light wave being confined in the end portion, a part of the light wave being absorbed in the light absorbing layer, and the predetermined component penetrating the end face to the target, and the predetermined component being reflected from the target and guided into the optical probe through the end face of the core; and a sensing section configured to sense the predetermined component emerged from the probe.

The optical pick-up apparatus is constructed such that a lens and a half mirror are arranged on the side of the proximal end of the optical probe. The light wave emitted from the light source is reflected by the half mirror so as to be collected through the lens on the optical probe on the side of the proximal end. Also, the light wave emitted from the proximal end of the optical probe passes through the lens and the half mirror so as to be collected on the light receiving section.

According to the present invention, a light absorbing film is formed on that side surface of the core which is substantially perpendicular to the polarized direction of the light wave propagated through the core so as to eliminate the oozing of the light wave in the particular direction, thereby obtaining a micro spot light. Further, a transparent clad region is formed on that side surface of the core, which is parallel to the polarized direction of the light wave propagated through the core so as to increase the light throughput efficiency. In addition, the object of the present invention can be effectively achieved by effectively utilizing the construction that the TM mode and the TE mode differ from each other in the propagation loss relative to the presence of the light absorbing film and in the size of the spot diameter. It follows that it is possible to make the spot diameter very small and to increase the throughput efficiency of the light wave passing through the core.

DETAILED DESCRIPTION OF THE INVENTION

Some embodiments of the present invention in respect of an optical probe and an optical pick-up apparatus using the optical probe will now be described in detail with reference to the accompanying drawings.

Figure 1:
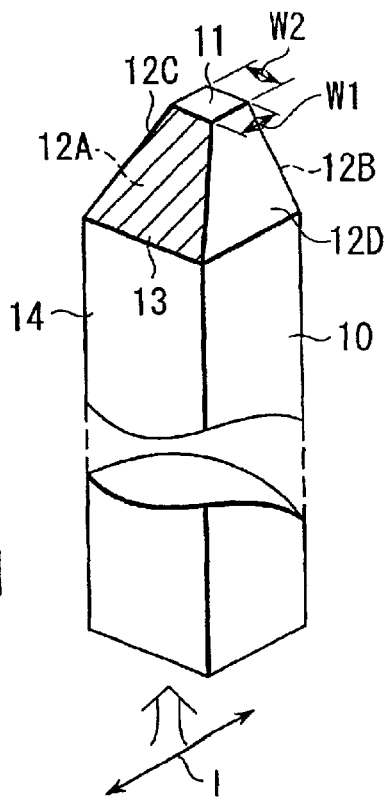
FIG. 1 is an oblique view schematically showing the construction of an optical probe according to a first embodiment of the present invention.

FIG. 1 is an oblique view schematically showing the construction of an optical probe according to a first embodiment of the present invention.

A reference numeral 10 shown in FIG. 1 represents a rod-like glass core rectangular in cross section, in which a light wave is guided. The distal end portion of the glass core 10 is worked pyramidal such that the distal end portion is gradually diminished from a rectangular base portion 14 of the core 10. The core 10 has a micro distal end face section 11 which is a rectangular shape. The micro distal end face section 11 has a first pair of opposing sides extending in the polarized direction I of the light wave propagated through the core 10 and also has a second pair of opposing sides extending in a direction perpendicular to the polarized direction of the light wave. The opposing sides of the first pair have a first width W1 which is not larger than half the wavelength $\lambda/2$ of the light wave or within a range between the half the wavelength $\lambda/2$ and the wavelength $\lambda$, for example of 50 nm, and the opposing sides of the second pair have a second width W2, for example of 200 nm.

The pyramidal distal end portion of the glass core 10 has four side surfaces 12A to 12D. The two side surfaces 12A and 12B having a same shape and same size, are inclined to each other and spaced apart in the polarized direction I of the light wave propagated through the core 10. Each of the side surfaces 12A and 12B is coated with a light absorbing film 13 formed of a metal film. The other two side surfaces 12C and 12D having a same size and shape, are also inclined to each other and are spaced apart in a direction perpendicular to the polarized direction of the light wave. The side surfaces 12C and 12D are not coated with the light absorbing film and are contacted to transparent clad regions, respectively. In the glass core 10 shown in FIG. 1, the side surfaces 12C and 12D are exposed to an atmosphere such as an air, a gas or an oil. In other words, formed is a clad of the air layer, the oil layer or the gas layer having a refractive index lower than that of the glass core 10.

In the optical probe as shown in FIG. 1, an light wave is transferred in the core 10 and guided in the pyramidal distal end portion of the glass core 10. Thus, the light wave is confined in the distal end portion of the core 10 and a part of the light wave is absorbed in the absorbing film 13 so that a predetermined component of the light wave penetrates the end face section 11 to form a micro spot on a target (not shown), for example, an optical disk.

In manufacturing the optical probe of the construction described above, the pyramidal distal end portion of the glass core 10 can be formed by etching or polishing the distal end portion of a glass rod having a rectangular cross section. Also, an optical fiber available on the market can be used as the glass rod.

In the optical probe shown in FIG. 1, the light absorbing films are formed on only the side surfaces inclined to the polarized direction of the light wave propagated through the glass core 10. The particular construction permits markedly diminishing the loss of the light wave passing through the optical probe. The principle of the particular effect will now be described.

Figure 2:
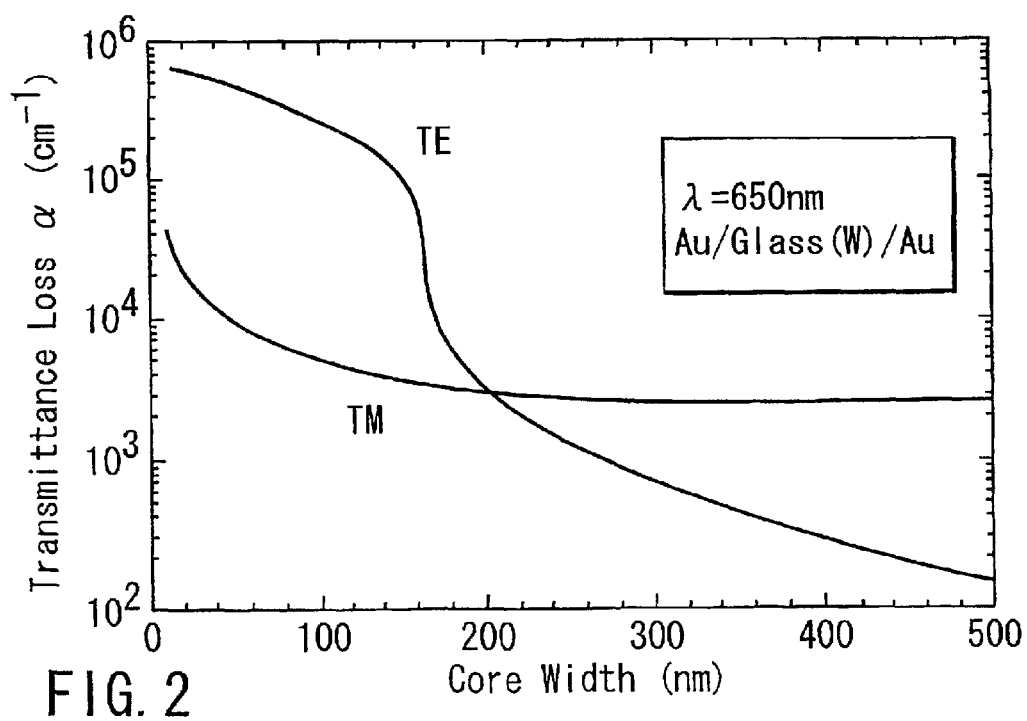
FIG. 2 is a graph exemplifying the calculation of the propagation loss caused by a glass/Au light waveguide.

FIG. 2 is a graph exemplifying the calculation of the propagation loss $\alpha$ (cm$^{-1}$) of the planar light waveguide formed of a glass core 10 and a metal clad 13. The graph covers the case where gold (Au) is used as the metal forming the light absorption film 13. As apparent from FIG. 2, if the wavelength within the core 10, i.e., the core 10 width W (nm), is rendered not larger than the half wavelength $\lambda/(2n)$, where n represents a refractive index, which is 1.5 (n=1.5) in the case of glass, the propagation loss of the TE mode is rapidly increased. This is because the ratio of the oozing of the light waveguide mode into the metal is rendered large, with the result that the influence given by the absorption by the metal is increased. In this region, the light wave is scarcely propagated in the TE mode.

On the other hand, the propagation loss in the TM mode is not appreciably increased even if the core 10 width is not larger than the half wavelength. As a result, the increase in the loss for the TM mode is not prominent even if a metal is present.

Figure 3:
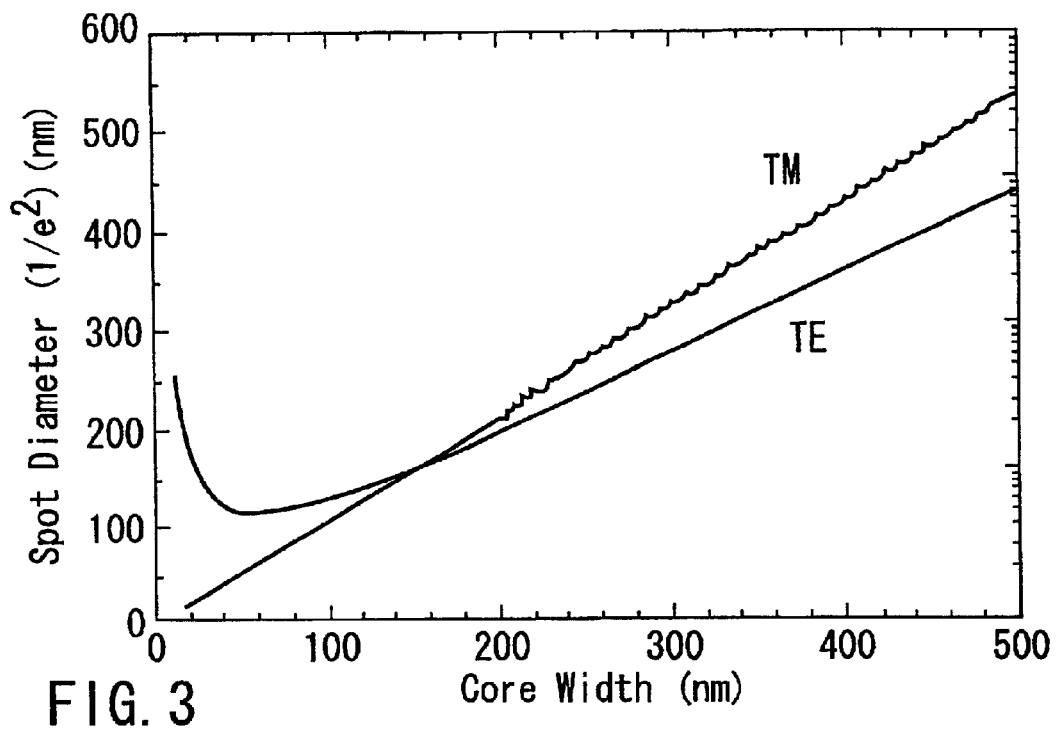
FIG. 3 is a graph exemplifying the calculation of the spot diameter in the glass/Au light waveguide.

FIG. 3 is a graph exemplifying the calculation of the spot diameter of the propagated light wave in respect of the light waveguide constructed as shown in FIG. 2. What should be noted is that the spot diameter of the TE mode is increased in the region where the core width is not larger than 50 nm, whereas, the spot diameter of the TM mode is not increased.

FIGS. 2 and 3 support that, in the region of the micro core width, the spot diameter of the TM mode is small, and the propagation loss is small.

In the first embodiment shown in FIG. 1, which utilizes the characteristics noted above, a metal coating 13 is applied to only the side surfaces 12A, 12B inclined to the polarized direction of the light wave so as to suppress the increase in the absorption loss in this configuration in which the light wave is guided in the TM mode. Since a metal coating 13 is not applied to the side surfaces 12C, 12D inclined to a direction perpendicular to the polarized direction of the light wave so as to suppress the increase in the absorption loss in this configuration in which the light wave is guided in the TM mode. Incidentally, it is impossible to obtain a sufficiently small spot in the direction of the TE mode. However, it is possible to obtain a spot diameter of 400 nm by, for example, setting the micro distal end face section 11 at about 200 nm.

Figure 4:
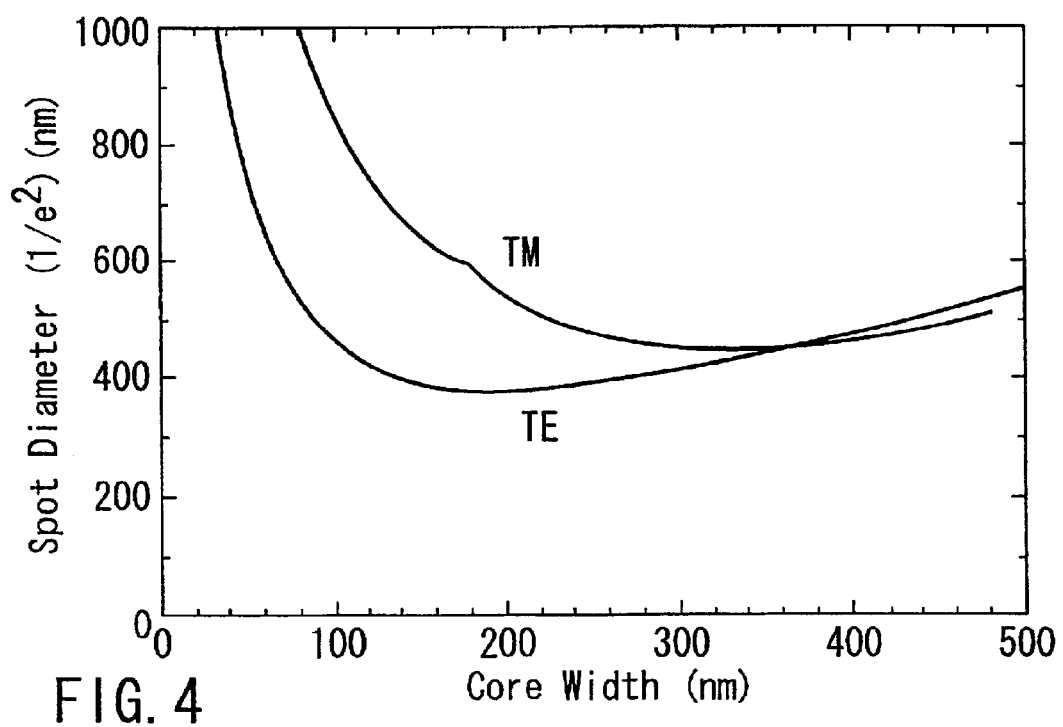
FIG. 4 is a graph exemplifying the calculation of the spot diameter in the glass/air light waveguide.

FIG. 4 is a graph exemplifying the calculation of the spot diameter relative to a planar light waveguide of a glass core/air clad structure. Where the air forms the clad, it is possible to obtain the minimum spot of 400 nm with the core width of 200 nm in respect of the TE mode, as described above. Also, in the case of a metal clad, it is possible to obtain a spot diameter substantially equal to the core width in respect of the TM mode as shown in FIG. 3. It follows that, if the width in this direction is set at 50 nm, it is possible to obtain a spot of 50 nm×400 nm with an optical probe having a distal end shape of 50 nm×200 nm. In addition, it is possible to realize a probe small in loss.

As described above, when it come to the optical probe according to the first embodiment of the present invention, the distal end portion of the glass core 10 is processed pyramidal to form four inclined distal end side surfaces 12A to 12D. In the first embodiment of the present invention, two of the four inclined distal end side surfaces 12A to 12D, i.e., the side surfaces 12A and 12B, which are inclined to the polarized direction of the light wave propagated through the core 10, are coated with the light absorption films 12 formed of metal films so as to eliminate the oozing of the light wave in the direction perpendicular to the polarized direction noted above, thereby making it possible to obtain a micro spot. Also, the light absorption films 12 are not formed on the other two side surfaces 12C and 12D, which are inclined in the polarized direction of the light wave propagated through the core 10, and these side surfaces 12C and 12D are in contact with the transparent layer. It follows that it is possible to increase the light wave throughput efficiency in the polarized direction of the light wave. Under the circumstances, it is possible to obtain a micro spot light of 50 nm×400 nm by setting the shape of the distal end face section 11 at 50 nm in the direction perpendicular to the polarized direction of the light wave propagated through the core 10 and at 200 nm in the direction parallel to the polarized direction noted above. In addition, it is possible to increase sufficiently the throughput efficiency of the light wave passing through the core 10.

An optical probe according to a second embodiment of the present invention will now be described. Specifically, FIG. 5 is an oblique view schematically showing the construction of the optical probe according to the second embodiment of the present invention.

Figure 5:
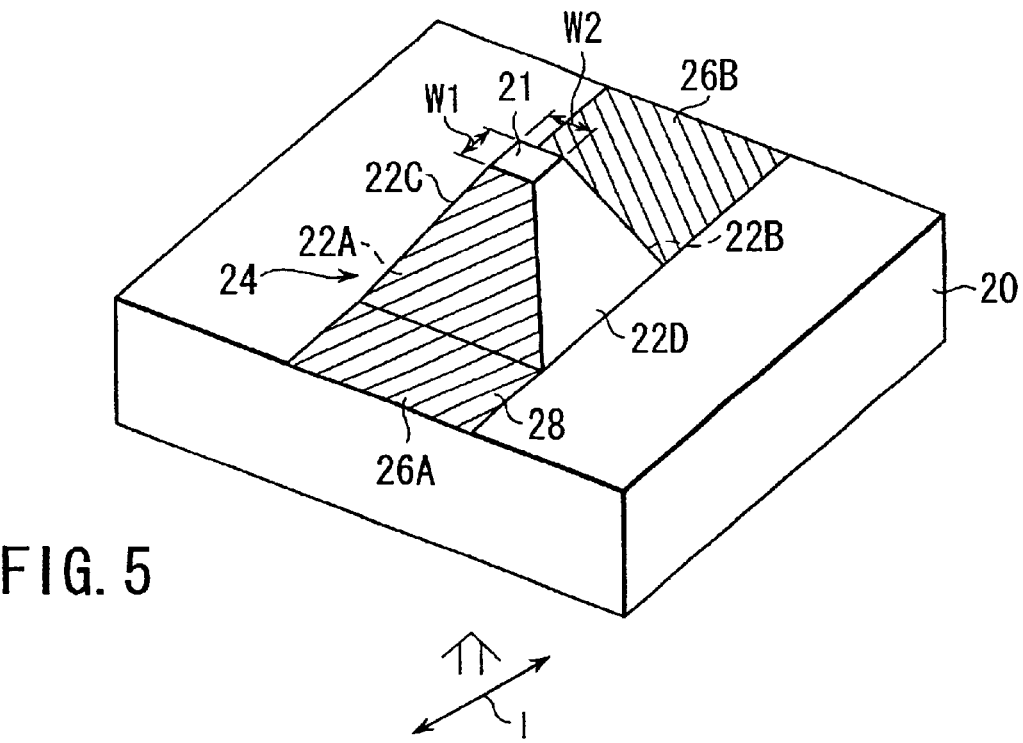
FIG. 5 is an oblique view schematically showing the construction of an optical probe according to a second embodiment of the present invention.

A reference numeral 20 shown in FIG. 5 represents a GaP substrate. A pyramidal projection 24 is arranged as a core in the central portion of the substrate 20. A micro face section 21 at the distal end of the projection (core) 24 is formed rectangular, with the result that four inclined side surfaces 22A to 22D are formed in the distal end portion of the projection (core) 24. The two side surfaces 22A and 22B of the four side surfaces 22A to 22D are positioned to cross the polarized direction I of the light wave propagated through the projection (core) 24. It should be noted that these two side surfaces 22A and 22B and the upper surfaces 26A and 26B of the substrate 20 contiguous to the side surfaces 22A and 22B are coated with light absorption films 28 formed of metal films. In the embodiment shown in FIG. 5, the light absorption film 28 is formed of aluminum (Al). On the other hand, the other inclined side surfaces 22C and 22D, which are parallel to the polarized direction of the light wave, are not coated with the light absorption film 28 and are in contact with a transparent clad. In this case, the air layer corresponds to the clad. In other words, the clad is formed of the air layer having a refractive index smaller than that of the core 24.

Figure 6:
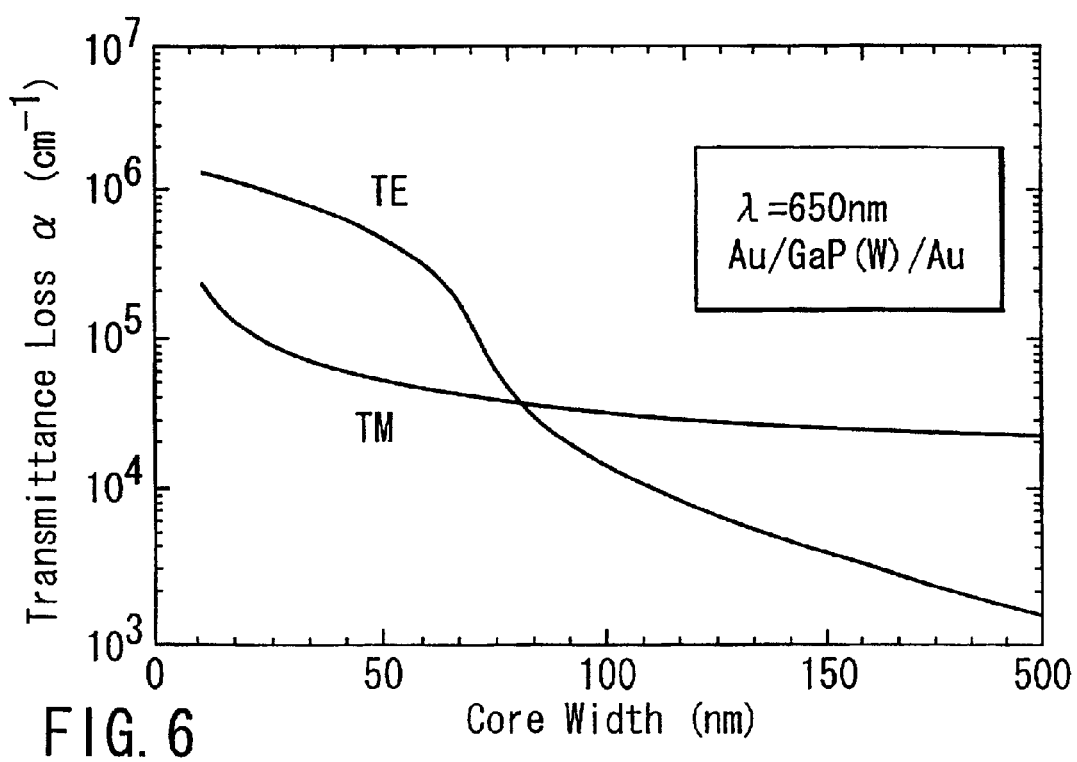
FIG. 6 is a graph exemplifying the calculation of the propagation loss in the glass/Al light waveguide.

FIG. 6 is a graph exemplifying the calculation of the propagation loss of a planar light waveguide consisting of the GaP core and the Al clad. The loss of the TE mode is rapidly increased, and the loss of the TM mode is not appreciably increased in the micro core width region, in this case, too.

Figure 7:
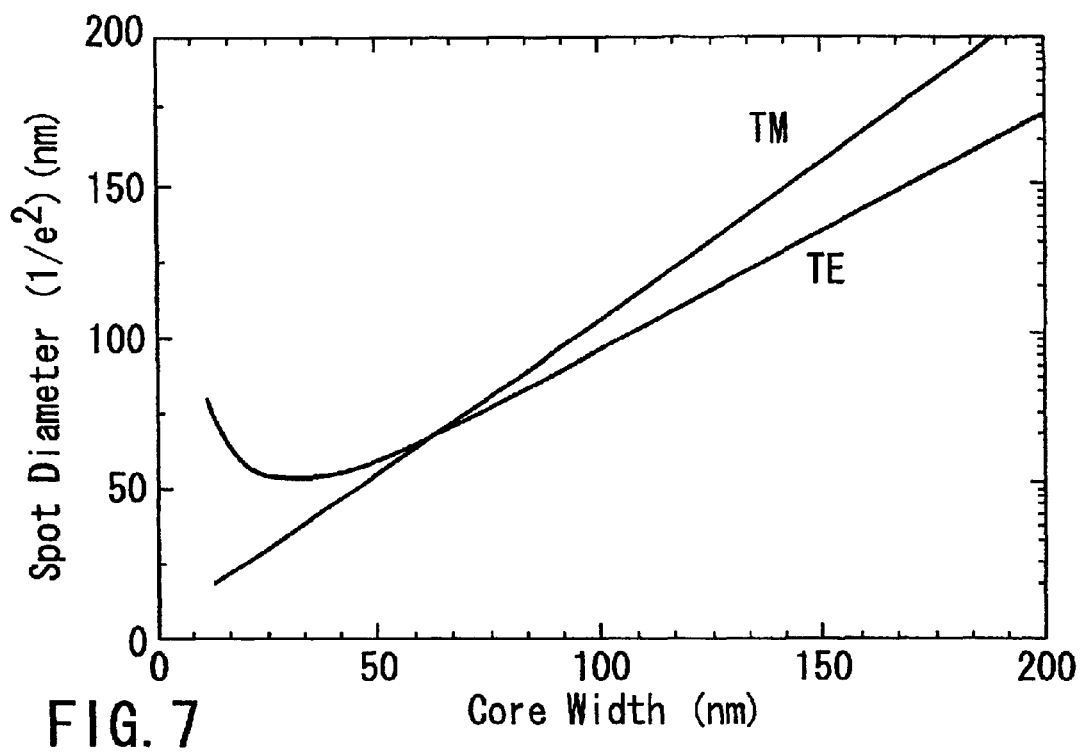
FIG. 7 is a graph exemplifying the calculation of the spot diameter in the GaP/Al light waveguide.
Figure 8:
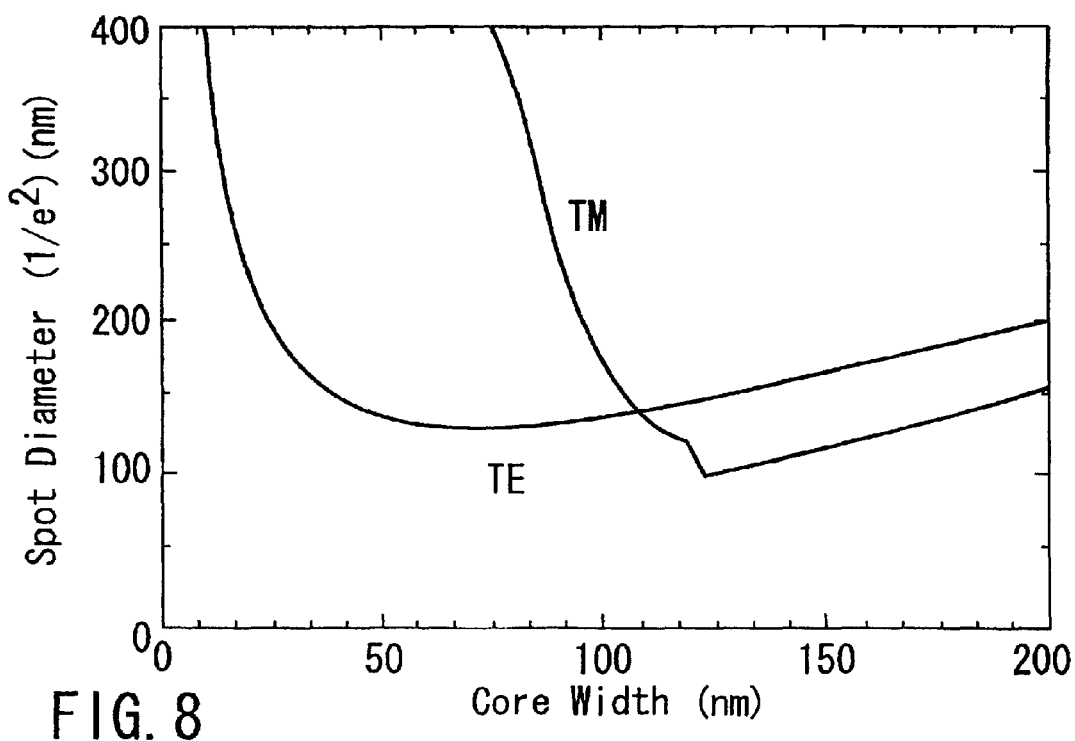
FIG. 8 is a graph exemplifying the calculation of the spot diameter in the GaP/air light waveguide.

FIG. 7 is a graph exemplifying the calculation of the spot diameter of the propagated light wave in respect of the construction of a planar light waveguide consisting of the GaP core and the Al clad. Also, FIG. 8 is a graph exemplifying the calculation of the spot diameter of the propagated light wave in respect of the construction of a planar light waveguide consisting of a GaP core and the air clad. As apparent from FIGS. 7 and 8, the metal clad makes it possible to obtain a spot diameter substantially equal to the core width in respect of the TM mode, and the air clad makes it possible to obtain a spot diameter of about 130 nm relative to the core width of 60 nm in respect of the TE mode.

It follows that it is possible to obtain a micro spot light of 50 nm×130 nm by, for example, setting the shape of the micro distal end face section 22 at a width W1 of 50 nm in the direction parallel to the polarized direction of the light wave propagated through the projection (core) 24 and at a width W2 of 60 nm in the direction perpendicular to the polarized direction noted above. As a result, it is possible to realize an optical probe small in loss.

An optical pick-up apparatus according to a third embodiment of the present invention will now be described. Specifically, FIG. 9 schematically shows the construction of the optical pick-up apparatus according to the third embodiment of the present invention.

Figure 9:
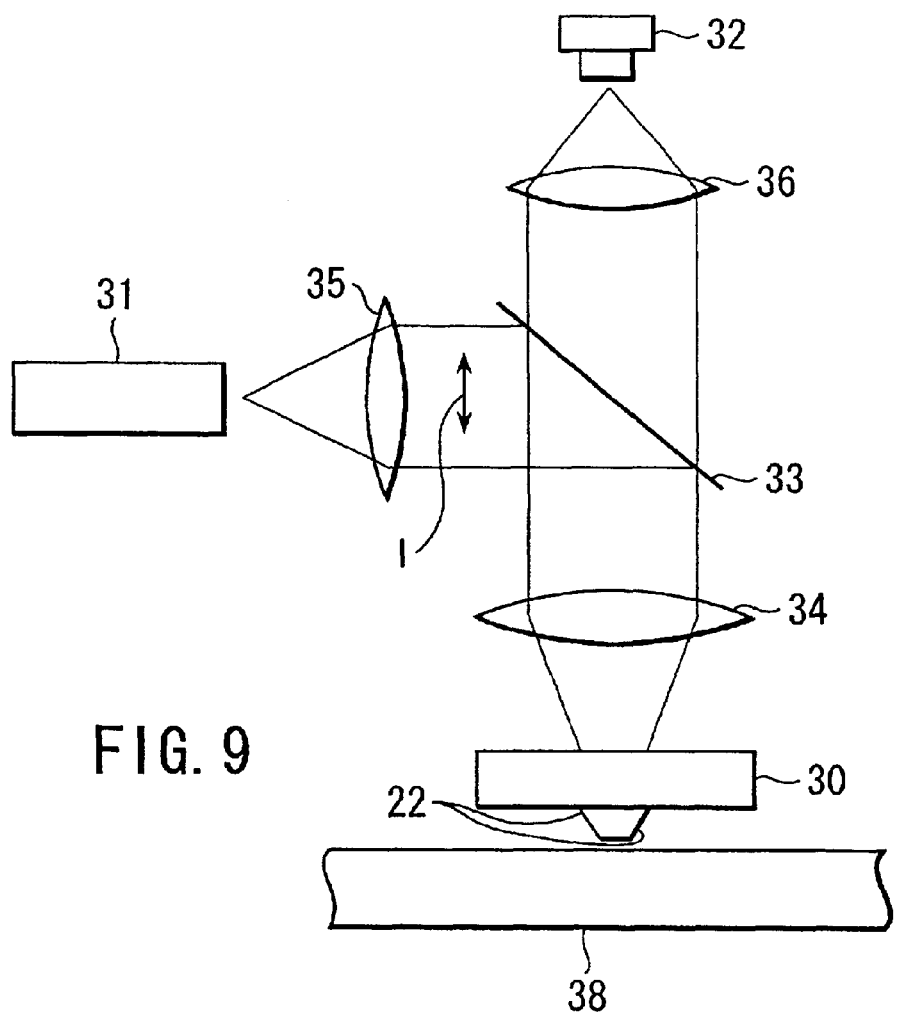
FIG. 9 schematically shows the construction of a pick-up apparatus according to a third embodiment of the present invention.

A reference numeral 30 shown in FIG. 9 represents the optical probe according to the second embodiment of the present invention, which is shown in FIG. 5. As shown in the drawing, the optical pick-up apparatus according to the third embodiment of the present invention comprises a laser diode (LD) 31 used as a light source, a photodiode (PD) 32 used as a light receiving element, a half mirror 33, a projection 34, a collimate lens 35, and a light collecting lens 36 in addition to the optical probe 30. A reference numeral 38 shown in FIG. 9 represents a target to be inspected.

The laser beam emitted from the LD 31 is collimated by the collimate lens 35 and, then, reflected by the half mirror 33 so as to be directed to the projection lens 34. The projection lens 34 serves to converge the collimated laser beam so as to irradiate the optical probe 30 on the side of the proximal end with the converged laser beam. The converged laser beam incident on the optical probe 30 is guided into the inside of the probe 30 so as to have its diameter miniaturized and, then, emitted from the distal end for irradiation of the surface of the target 38.

A part of the laser beam reflected from the surface of the target 38 is incident on the distal end of the optical probe 30 so as to be guided within the probe 30 and, then, emitted to the outside from the proximal end of the optical probe 30. The laser beam emitted from the proximal end of the optical probe 30 passes through the half mirror 33 and, then, is converged by the convergent lens 36 so as to form an image on the photodiode (PD) 32.

The signal detected by the photodiode (PD) 32 contains information on the irradiated surface region on the target 38 and is changed in accordance with the surface state of the target 38. It follows that it is possible to observe the surface state of the target 38 on the basis of the signal detected by the PD 32 by relatively moving in parallel the optical probe 30 and the target 38.

The polarized direction of the laser beam emitted from the LD 31 is in the up-down direction on the paper, and the polarized direction of the laser beam reflected by the half mirror 33 is in the right-left direction on the paper. It follows that the side surfaces of the optical probe 30, which are coated with a light absorber 28, are the two inclined side surfaces 22A and 22B inclined to the polarized direction I of the laser beam propagated through the projection (core) 24, with the result that it is possible to converge the light wave into a micro spot. In the apparatus shown in FIG. 9, the laser beam emitted from the LD 31 is polarized in the up-down direction on the paper, and the light absorber 28 of the optical probe 30 is arranged on the left side surface and the right side surface of the projection (core) 24. Where the polarized direction of the light wave emitted from the LD 31 is perpendicular to the paper, the light absorber 28 should be formed on the front side surface and the back side surface of the projection 24.

As described above, the optical probe 30 equal to that described in conjunction with the second embodiment of the present invention is used in the optical pick-up apparatus according to the third embodiment of the present invention. In addition, the optical pick-up apparatus is provided with a mechanism (31, 33, 34, 25) for introducing the light wave into the optical probe 30 and another mechanism (32, 33, 34, 36) for guiding the light wave out of the optical probe 30. The particular construction of the optical pick-up apparatus makes it possible to converge the light wave irradiating the target 38 into a micro spot and to detect the light wave from the microscopic region on the surface of the target 38. It follows that it is possible to perform the recording with a resolution not larger than the diffraction-limited of the light wave and to measure the surface state of target with a high accuracy.

The present invention is not limited to each of the embodiments described above. In the embodiments described above, the cross section of the core portion (the entire core portion in the first embodiment, and the projecting portion of the core in the second embodiment) is shaped rectangular. However, it is possible for the cross section of the core portion to be shaped circular or elliptical. Where the cross section of the core portion is shaped circular or elliptical, the metal film coating the side surface of the core portion should be formed in a region facing the polarized direction of the light wave, i.e., the surface within a range of 90±45° relative to the polarized direction.

Figure 10:
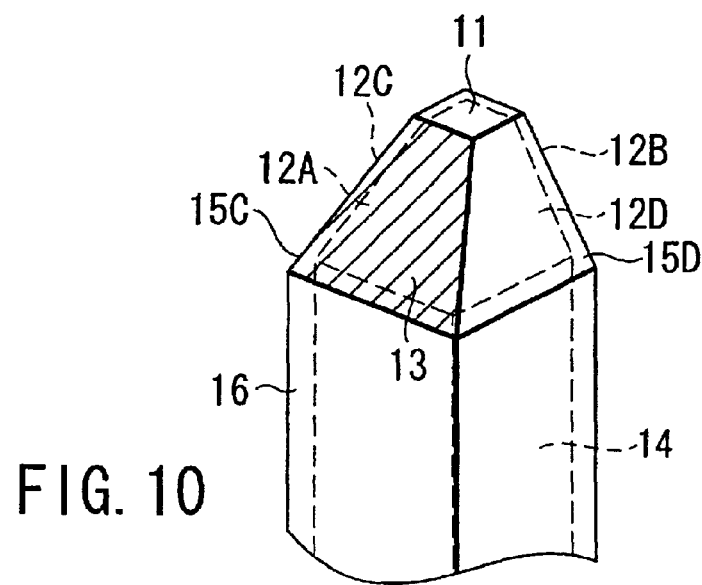
FIG. 10 is an oblique view schematically showing the construction of an optical probe according to a modified embodiment of FIG. 1.

Also, the material of the light absorbing film is not limited to gold and aluminum. It is possible to use another metal as far as the light wave can be absorbed. It is also possible to use a material other than the metal. Also, it is not absolutely necessary for the surface other than the surface on which is formed the light absorbing film to be in contact with the air. It is possible for the particular side surfaces 12A and 12B to be coated with a transparent film 15C and 15D having a refractive index smaller than that of the core, as shown in FIG. 10. In this construction as shown in FIG. 10, the rectangular base 14 of the core 10 is also coated with a transparent film 15 having the refractive index smaller than that of the core.

Further, the material of the core is not limited to glass and a semiconductor as far as the core material sufficiently transmits the light wave. For example, it is possible to use GaN with respect to the wavelength shorter than that in the embodiments described above.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical probe for guiding a light wave in a predetermined propagating direction and outputting a predetermined component of the light wave, the optical probe being located in an atmosphere, and the light wave being polarized in a first direction perpendicular to the predetermined propagating direction, comprising:

a core configured to transmit the light wave, having a first refractive index, comprising a base portion, and a end portion having a end face and first and second opposed surfaces, the end portion being gradually diminished from the base portion to the end face, the first and second opposed surfaces being extended from the base portion to the end face the first, opposed surface being inclined to the first direction and extended along a second direction perpendicular to the first direction and the propagating direction and the second opposed surface being inclined to the second direction and extended along the first direction; and a light absorbing layer formed on the first opposed surface of the core, the second opposed surface being exposed to the atmosphere, the light wave guided in the core being confined in the end portion, a part of the light wave being absorbed in the light absorbing layer, and the predetermined component penetrating the end face.

2. The optical probe according to claim 1, wherein the light absorbing layer is formed of a metal.

3. The optical probe according to claim 1, wherein the core is formed of a dielectric material or a semiconductor.

4. An optical probe for guiding a light wave in a propagating direction and outputting a predetermined component of the light wave, the optical probe being located in an atmosphere, comprising:

a core configured to transmit the light wave, having a first refractive index, comprising a base portion, and a end portion having a end face and first and second pairs of opposed surfaces, the end portion being gradually diminished from the base portion to the end face, the first and second pairs of opposed surfaces being extended from the base portion to the end face, the first pair of the opposed surfaces being inclined to each other, spaced apart in a first direction perpendicular to the predetermined propagating direction, and the second pair of the opposed surfaces being inclined to each other and spaced apart in a second direction perpendicular to the first direction and the predetermined direction;

a light absorbing layer formed on the first pair of the opposed surfaces, the second pair of the opposed surfaces being exposed to the atmosphere, the light wave being confined in the end portion, a part of the light wave guided in the core being absorbed in the light absorbing layer, and the predetermined component penetrating the end face.

5. The optical probe according to claim 4, wherein the light absorbing layer is formed of a metal.

6. The optical probe according to claim 4, wherein the core is formed of a dielectric material or a semiconductor.

7. The optical probe according to claim 4, wherein the light wave has a polarized direction and the first direction corresponds to the polarized direction.

8. An optical probe for guiding a light wave in a predetermined propagating direction and outputting a predetermined component of the light wave, the light wave being polarized in a first direction perpendicular to the predetermined propagating direction, comprising:

a core configured to transmit the light wave, having a first refractive index, comprising a base portion, and a end portion having a end face and first and second opposed surfaces, the end portion being gradually diminished from the base portion to the end face, the first and second opposed surfaces being extended from the base portion to the end face, the first opposed surface being inclined to the first direction and extended along a second direction perpendicular to the first direction and the propagating direction and the second opposed surface being inclined to the second direction and extended along the; first direction a light absorbing layer formed on the first opposed surface of the core; and a transparent cladding layer having a second refractive index lower than the first refractive index of the core, and formed on the second opposed surface of the core, the light wave being confined in the end portion, a part of the light wave guided in the core being absorbed in the light absorbing layer, and the predetermined component penetrating the end face.

9. The optical probe according to claim 8, wherein the light absorbing layer is formed of a metal.

10. The optical probe according to claim 9, wherein the core is formed of a dielectric material or a semiconductor.

11. An optical probe for guiding a light wave in a predetermined propagating direction and outputting a predetermined component of the light wave, comprising:

a core configured to transmit the light wave, having a first refractive index, comprising a base portion, and a end portion having a end face and first and second pairs of opposed surfaces, the end portion being gradually diminished from the base portion to the end face, the first and second pairs of opposed surfaces being extended from the base portion to the end face, the first pair of the opposed surfaces being inclined to each other, and spaced apart in a first direction perpendicular to the predetermined propagating direction and the second pair of the opposed surfaces being inclined to each other and spaced apart in a second direction perpendicular to the first direction and the predetermined propagating direction;

a light absorbing layer formed on the first pair of the opposed surfaces; and a transparent cladding layer having a second refractive index lower than the first refractive index of the core, and formed on the second pair of the opposed surfaces, the light wave guided in the core being confined in the end portion, a part of the light wave being absorbed in the light absorbing layer, and the predetermined component penetrating the end face.

12. The optical probe according to claim 11, wherein the light absorbing layer is formed of a metal.

13. The optical probe according to claim 11, wherein the core is formed of a dielectric material or a semiconductor.

14. The optical probe according to claim 11, wherein the light wave has a polarized direction and the first direction corresponds to the polarized direction.

* * * * *